United States Patent
Kita

(10) Patent No.: US 10,875,635 B2
(45) Date of Patent: Dec. 29, 2020

(54) MULTICOPTER

(71) Applicant: HONDA MOTOR CO., LTD., Tokyo (JP)

(72) Inventor: Akinori Kita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 377 days.

(21) Appl. No.: 16/108,716

(22) Filed: Aug. 22, 2018

(65) Prior Publication Data

US 2019/0061924 A1    Feb. 28, 2019

(30) Foreign Application Priority Data

Aug. 28, 2017    (JP) ................................. 2017-163436

(51) Int. Cl.
| | |
|---|---|
| *B64C 27/12* | (2006.01) |
| *B64C 27/08* | (2006.01) |
| *B64D 27/10* | (2006.01) |
| *F16H 1/46* | (2006.01) |
| *F16H 57/08* | (2006.01) |
| *B64D 27/24* | (2006.01) |
| *B64D 27/02* | (2006.01) |

(52) U.S. Cl.
CPC ............... *B64C 27/12* (2013.01); *B64C 27/08* (2013.01); *B64D 27/10* (2013.01); *B64D 27/24* (2013.01); *F16H 1/46* (2013.01); *F16H 57/082* (2013.01); *B64D 2027/026* (2013.01)

(58) Field of Classification Search
CPC .................................................... B64C 39/024
See application file for complete search history.

(56) References Cited

U.S. PATENT DOCUMENTS

| | | | |
|---|---|---|---|
| 2008/0184906 A1* | 8/2008 | Kejha | B64C 39/024 102/374 |
| 2016/0325834 A1* | 11/2016 | Foster | B64C 27/20 |
| 2017/0066531 A1* | 3/2017 | McAdoo | B64C 27/08 |
| 2017/0175856 A1* | 6/2017 | Beddok | B64C 27/14 |

FOREIGN PATENT DOCUMENTS

| | | |
|---|---|---|
| JP | 2006-321458 | 11/2006 |
| JP | 2009-012615 | 1/2009 |
| JP | 2010-137844 | 6/2010 |
| JP | 2015-137092 | 7/2015 |
| JP | 2017-512699 | 5/2017 |
| JP | 2017-138162 | 8/2017 |

* cited by examiner

Primary Examiner — Richard G Davis
(74) Attorney, Agent, or Firm — Rankin, Hill & Clark LLP

(57) ABSTRACT

There is provided a multicopter having a frame, four rotors attached to the frame and each having an input shaft, four motor-generators installed one on each of the rotors and each having an input-output shaft, a single gas-turbine engine connected to the motor-generators and having an output shaft. The input shaft of each rotor, the input-output shaft of each motor-generator and the output shaft of the engine are respectively connected with each other by a speed reducer mechanism having a sun gear, ring gear and planetary carrier.

12 Claims, 11 Drawing Sheets

MULTICOPTER

CROSS-REFERENCE TO RELATED APPLICATION

This application is based upon and claims the benefit of priority from Japanese Patent Application No. 2017-163436 filed on Aug. 28, 2017, the contents of which are incorporated herein by reference.

BACKGROUND OF THE INVENTION

Field of the Invention

This invention relates to a multicopter, more particularly a hybrid multicopter equipped with different types of power sources, namely, motor-generators and an engine.

Description of Related Art

As technologies related to hybrid multicopters equipped with motor-generators and an engine as different types of power sources can be mentioned those taught by Patent Document 1 (Japanese Unexamined Patent Publication No. JP2010-137844) and Patent Document 2 (Japanese Unexamined Patent Publication No. JP2015-137092). The technology of Patent Document 1 relates to a configuration that comprises an engine and motor-generators driven by the engine, wherein rotors (ducted fans) are driven by both the engine and the motor-generators.

The technology of Patent Document 2 relates to a configuration that comprises an engine and motor-generators driven by the engine, wherein one main rotor is driven by the engine, four sub rotors are driven by the motor-generators, and power generated by the generators is once stored in a battery and then supplied to the motors.

Although the technology of Patent Document 1 is configured in the aforesaid manner with the aim of reducing aircraft weight and thereby increase cruising range (improve fuel performance), it cannot easily realize this goal because it is silent regarding how the engine and motor-generators are connected to the rotor rotating shafts.

Although the technology of Patent Document 2 is configured in the aforesaid manner for the purpose of increasing cruising range, it cannot easily realize this goal because it is similarly silent regarding how the engine and motor-generators are connected to the rotor rotating shafts.

SUMMARY OF THE INVENTION

An object of this invention is therefore to overcome the aforesaid problem by providing a hybrid multicopter configured to increase cruising range and enhance fuel performance.

In order to achieve the object, this invention provides a multicopter, comprising: a frame; multiple rotors attached to the frame and each having an input shaft; multiple motor-generators installed one on each of the multiple rotors and each having an input-output shaft; an engine connected to the multiple motor-generators and having an output shaft; and multiple speed reducer mechanisms each comprising a planetary gear mechanism installed on one of the multiple rotors; the planetary gear mechanism having a sun gear, ring gear and planetary carrier which connects planetary gears; wherein the input shaft of each rotor, the input-output shaft of each motor-generator and the output shaft of the engine are connected with each other by each speed reducer mechanism.

DETAILED DESCRIPTION OF THE INVENTION

An embodiment for implementing the multicopter according to this invention are explained with reference to the attached drawings in the following.

First Embodiment

Figure 1:
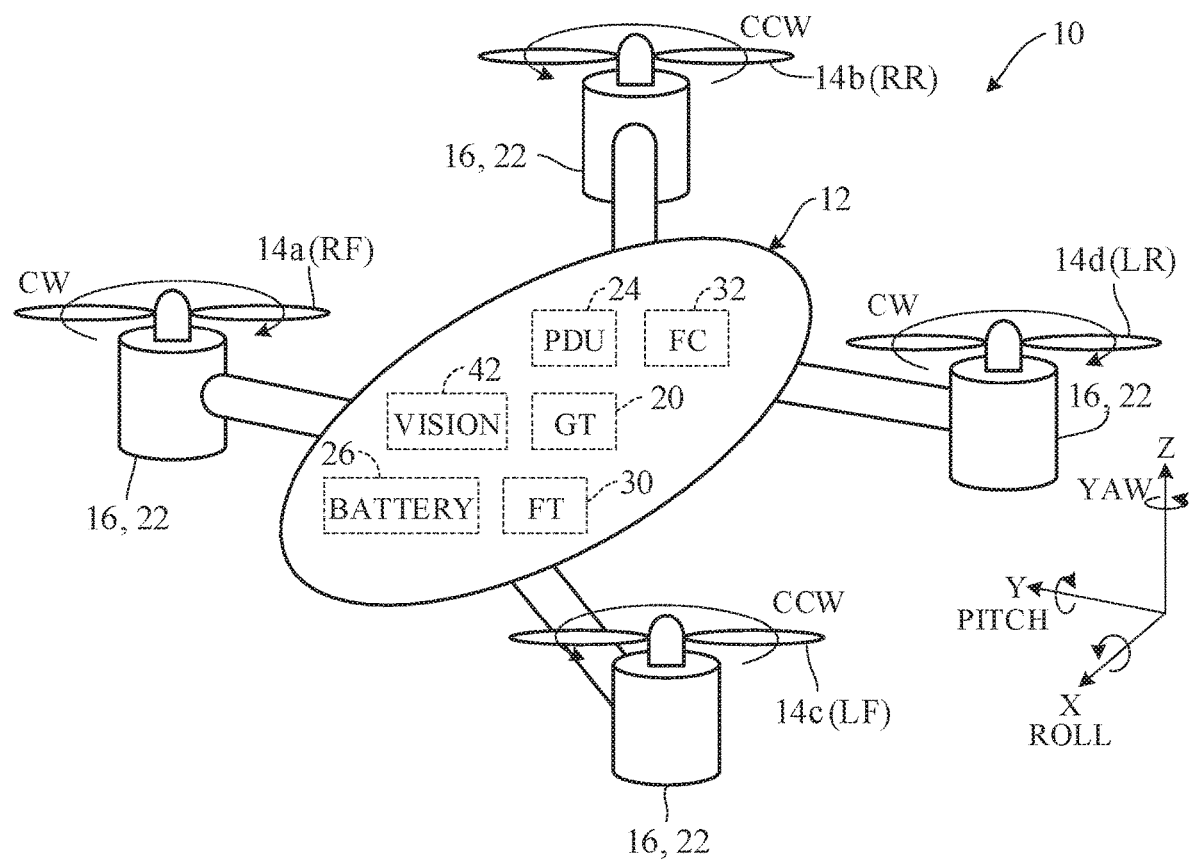
FIG. 1 is a schematic diagram generally illustrating a multicopter according to a first embodiment of the present invention.
Figure 2:
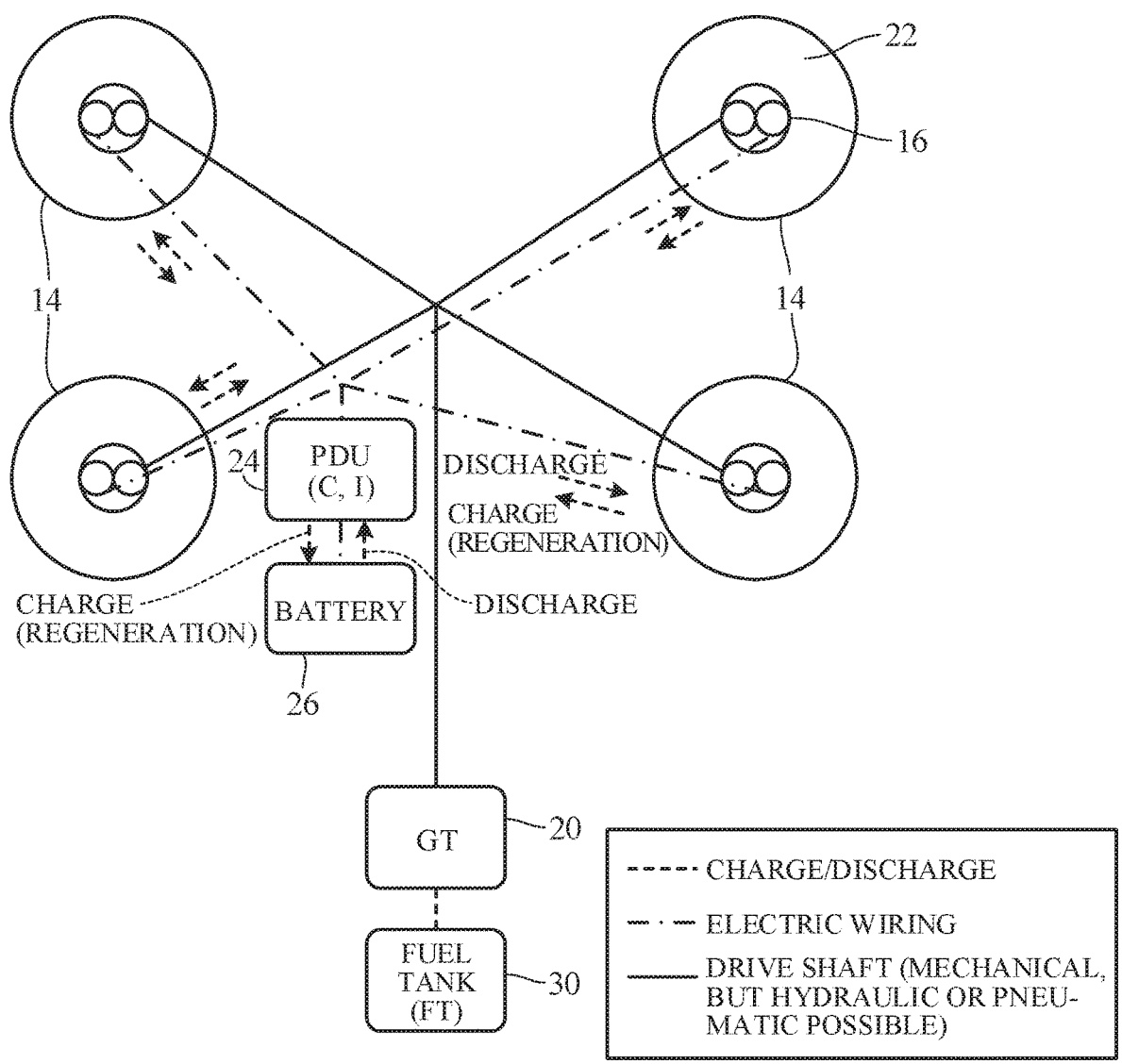
FIG. 2 is an explanatory view of the multicopter of FIG. 1 as seen from above.
Figure 3:
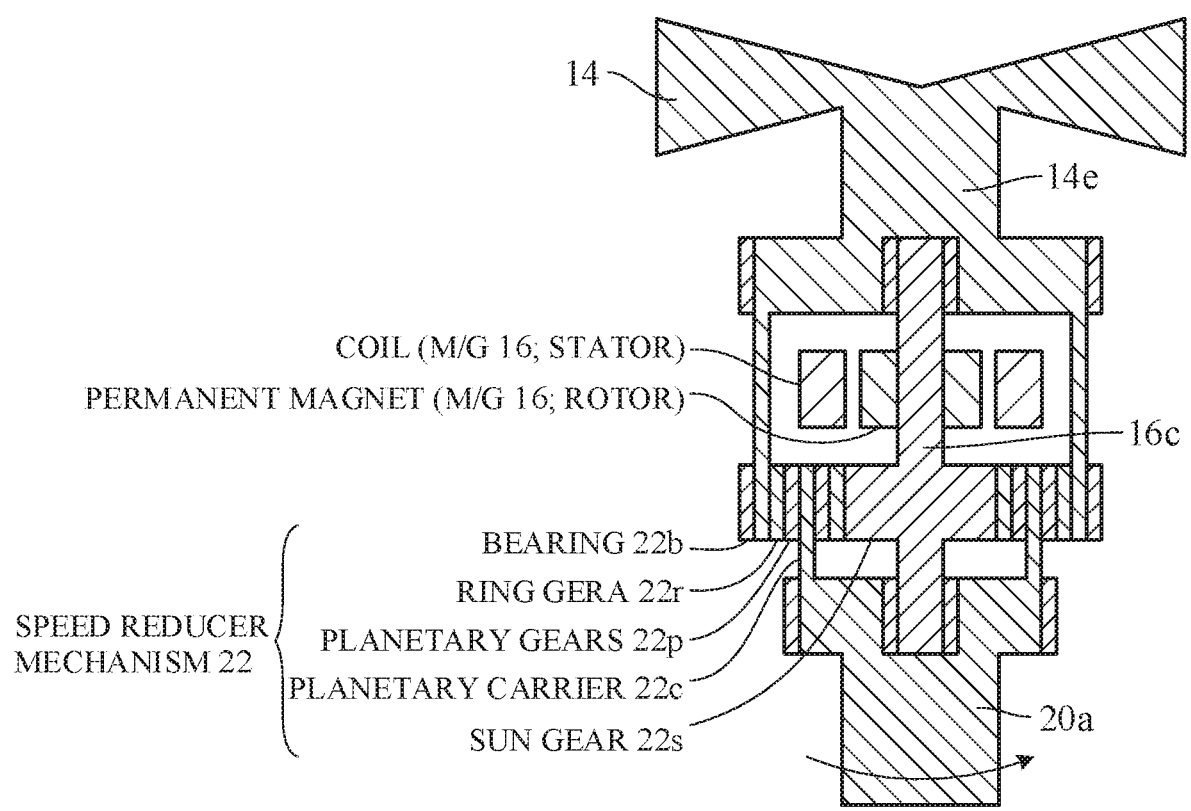
FIG. 3 is an explanatory view schematically illustrating a speed reducer mechanism of the multicopter of FIG. 2.
Figure 4:
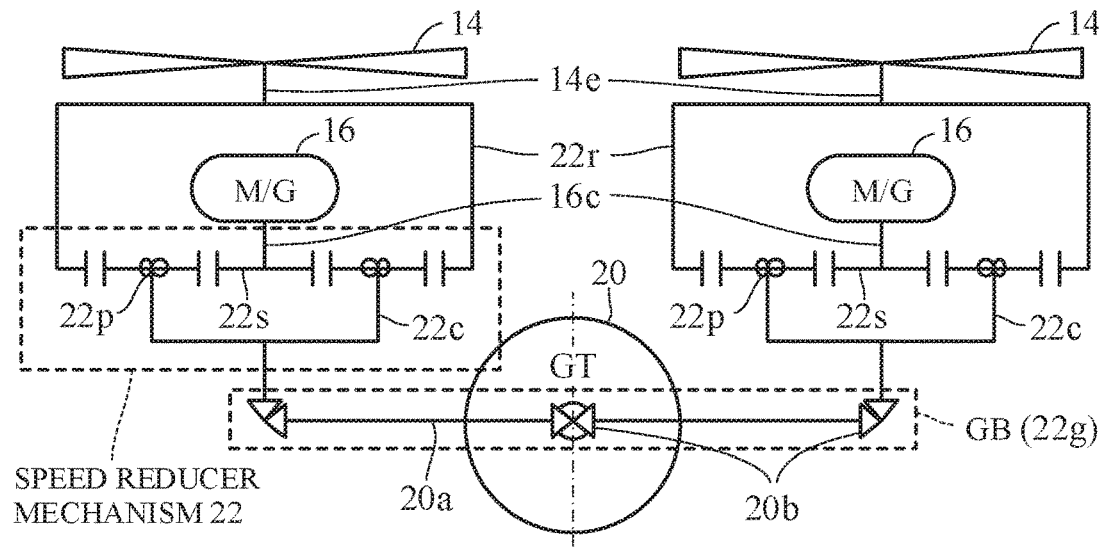
FIG. 4 is a diagram schematically representing the speed reducer mechanism of FIG. 3.
Figure 5:
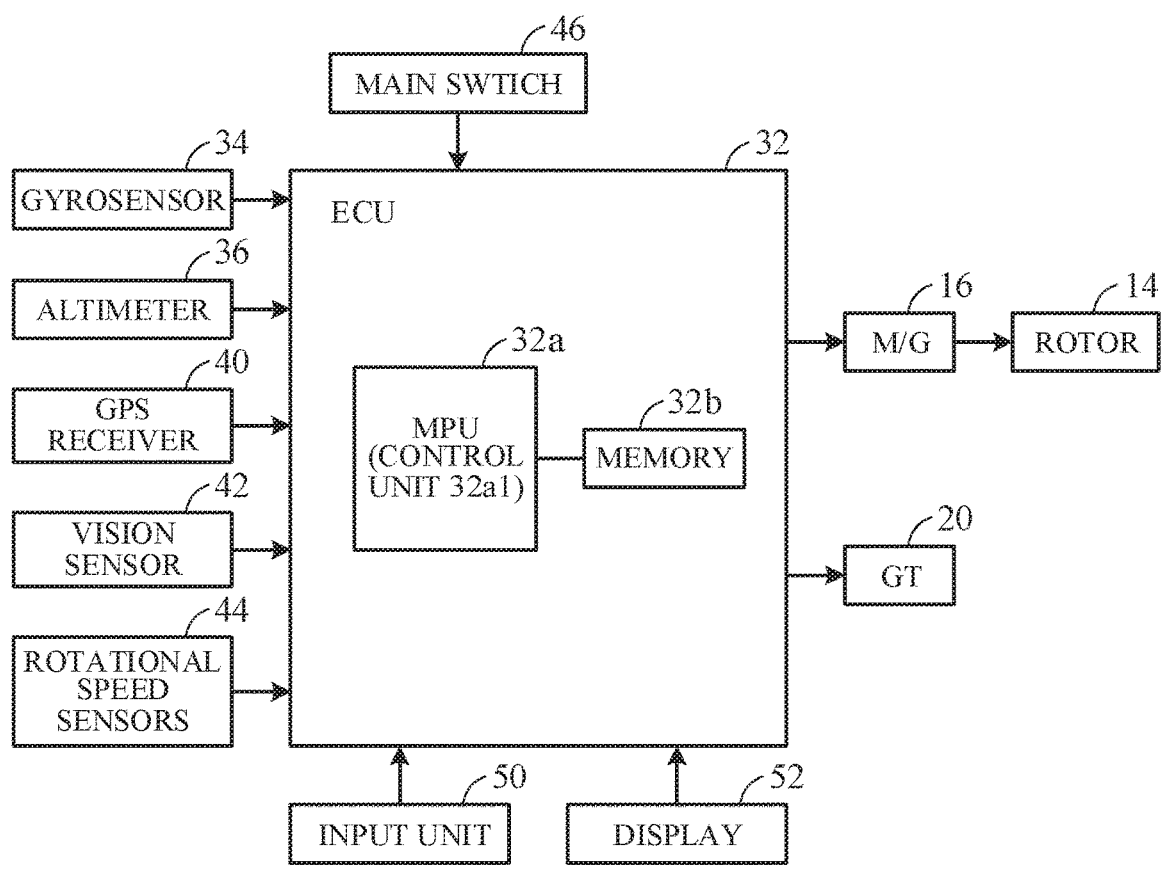
FIG. 5 is a block diagram showing input-output relationships in a flight controller of the multicopter of FIG. 1.
Figure 6:
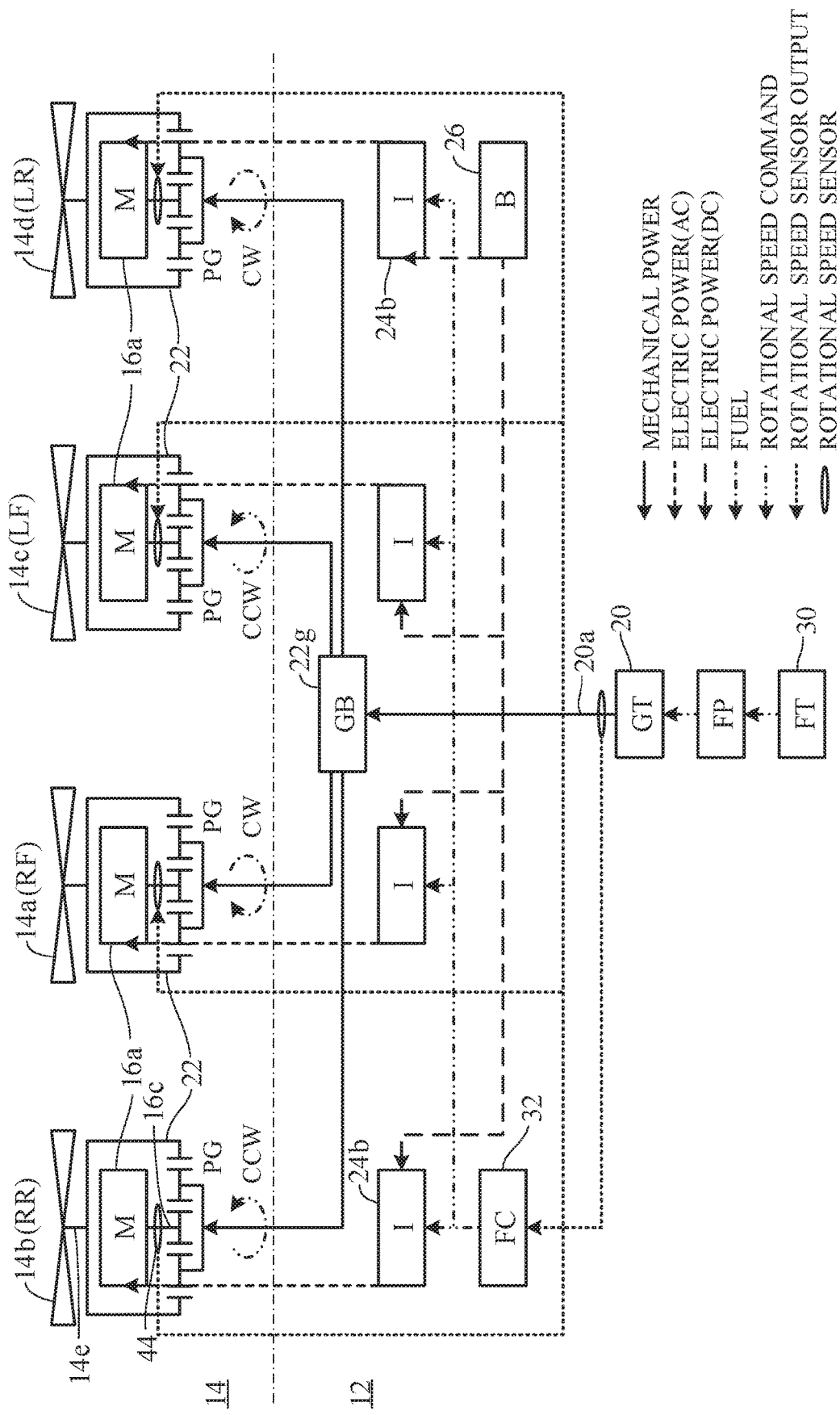
FIG. 6 is an explanatory diagram showing GT and M/G energy transmission during takeoff and landing of a multicopter.

FIG. 1 is a schematic diagram generally illustrating a multicopter according to a first embodiment of the present invention; FIG. 2 is an explanatory view of the multicopter of FIG. 1 as seen from above; FIG. 3 is an explanatory view schematically illustrating a speed reducer mechanism of the multicopter of FIG. 2; FIG. 4 is a diagram schematically representing the speed reducer mechanism of FIG. 3; FIG. 5 is a block diagram showing input-output relationships in a flight controller of the multicopter of FIG. 1; and FIG. 6 is an explanatory diagram showing GT and M/G energy transmission during takeoff and landing of a multicopter.

In FIGS. 1 to 6, symbol 10 designates a multicopter. The multicopter 10 comprises a frame 12, multiple rotors 14

(14a, 14b, 14c, 14d) attached to the frame 12, motor-generators 16 installed one on each of the multiple rotors 14, at least one engine 20 connected to the motor-generators 16, and speed reducer mechanisms 22.

The engine 20 is a gas-turbine engine (hereinafter "GT 20"). Aircraft gas-turbine engines are of four types: turbojet, turbofan, turboprop and turboshaft. The GT 20 is a turboshaft engine. (As pointed out later, the GT 20 can optionally be a reciprocating internal combustion engine).

Figure 8:
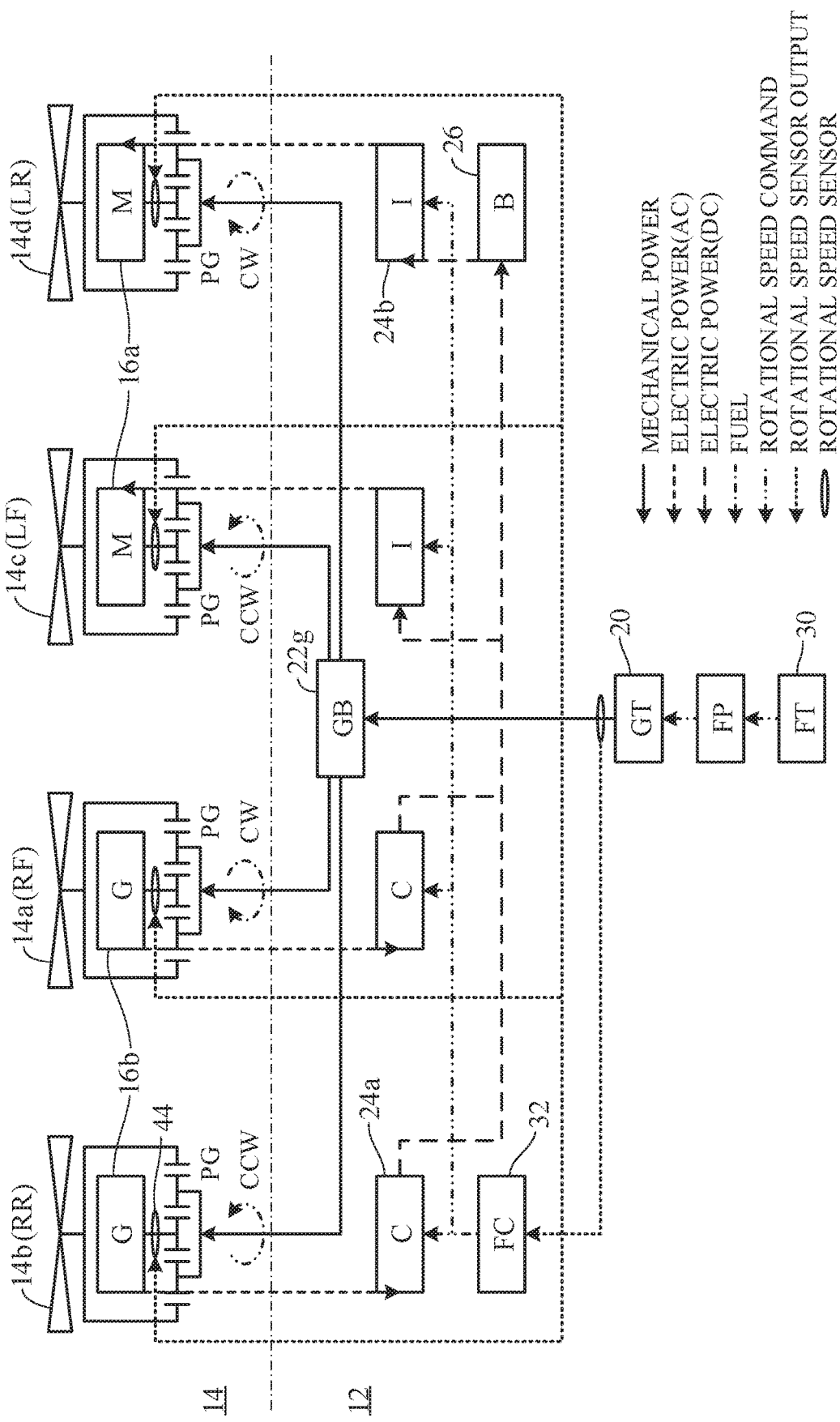
FIG. 8 is an explanatory diagram showing GT and M/G energy transmission during flight.

As shown in FIG. 3, the motor-generators 16 (hereinafter M/Gs 16) are each configured as a brushless DC motor comprising on its fixed side an outer rotor wound with a coil and inward of the outer rotor a stator having permanent magnets on its outer periphery. The M/G 16 operates as a motor 16a when supplied with power and as a generator 16b when rotated by external force, as shown in FIG. 6 and FIG. 8 referred to later as "M" or "G".

A PDU (Power Drive Unit) 24 is connected to the M/Gs 16. The PDU 24 is equipped with a converter (C) 24a and an inverter (I) 24b. Its converter 24a converts AC generated by the generators (G) 16b of the M/Gs 16 to DC for storage in a battery (B) 26.

DC power stored in the battery 26 is inverted (converted back) to AC power by the inverter 24b as necessary and supplied to three-phase coils of the motors (M) 16a of the M/Gs 16 in order to rotate the motors 16a.

The frame 12 is shaped like an ellipsoid cylinder and accommodates, inter alia, the GT 20, a fuel tank (FT) 30 for storing GT 20 fuel (highly refined kerosene), the PDU 24, the battery 26, and a flight controller (FC) 32. The multicopter 10 is configured as an unmanned aerial vehicle.

The rotors (fans, propellers) 14 are provided as multiple units, specifically as four units, to configure a quadcopter comprising, as viewed from above the frame 12, 2n (n:n≥2) radially attached units, more specifically a quadcopter in which n=2 (2 sets) comprising a RF (Right Front) rotor 14a, a RR (Right Rear) rotor 14b, a LF (Left Front) rotor 14c, and a LR (Left Rear) rotor 14d.

The number of rotors 14 is not limited to four and it is optionally possible, for example, to configure a hexacompter (n=3) or an octacompter (n=4). As shown in FIG. 3, rotors (propellers, fans) connected to distal ends of input shafts (rotating shafts) 14e of the four rotors 14 are of known shape.

As seen in a view of the frame 12 from above as shown in FIG. 1, the four rotors 14 are divided into two sets whose respective members are located at diagonally opposite positions, namely one set comprising the rotors 14a and 14d that are, for example, rotated clockwise (CW) and another set comprising the rotors 14b and 14c that are rotated counterclockwise (CCW), thereby achieving a configuration that can stably maintain posture or attitude of the multicopter 10. The frame 12 of the multicopter 10 is not directionally differentiated (has no front, rear, left or right directions), and the multicopter 10 is configured to have arbitrary 360-degree flight capability.

The four speed reducer mechanisms 22 each comprises a planetary gear mechanism installed on one of the four rotors 14, and as shown in FIGS. 3, 4 and 6, a configuration is adopted in the speed reducer mechanism 22 by which the input shaft 14e of the rotor 14, an input-output shaft 16c of the associated M/G 16 and an output shaft 20a of the GT 20 are connected with a sun gear 22s, ring gear 22r and planetary carrier 22c (which connects multiple (four) planetary gears 22p) of the planetary gear mechanism. Reference symbol 22b designates a bearing.

Specifically, as well illustrated in FIG. 4, a configuration is adopted in the speed reducer mechanism 22 whereby the output shaft 20a of the GT 20 is connected to the planetary carrier 22c of the planetary gear mechanism, the input-output shaft 16c of the M/G 16 is connected to the sun gear 22s of the planetary gear mechanism, and the ring gear 22r of the planetary gear mechanism is connected to the input shaft 14e of the rotor 14.

When rotation of the output shaft 20a of the GT 20 is CW, the CW-rotating rotors 14a and 14d are connected to the planetary carrier 22c as is, but in the case of the CCW-rotating rotors 14b and 14c, the output shaft 20a of the GT 20 is, as shown in FIG. 4, connected to the planetary carrier 22c through bevel gears (reversing mechanisms) 20b. Optionally, joints or the like can be used instead of the bevel gears 20b. Reference symbol 22g appearing in FIG. 4 and later figures designates gear boxes for accommodating the planetary gear mechanisms of the speed reducer mechanisms 22.

Rotational speeds of the rotors 14 are set as follows based on a common GT rotational speed (GT 20 rotational speed) and individual M/G rotational speeds (M/G 16 rotational speeds).

Rotor Rotational Speed=Gear Ratio1×GT Rotational Speed+Gear Ratio2×MG Rotational Speed In the above equation, Gear Ratio 1 is a fixed speed-reducing ratio from GT 20 output rotational speed to rotor 14 rotational speed and is a speed reducer mechanism 22 design value. Gear Ratio 2 is a fixed speed-reducing ratio from M/G 16 output rotational speed to rotor 14 rotational speed and is also a speed reducer mechanism 22 design value.

For example, with this configuration, immobilization of the sun gear 22s by stopping the M/G 16 determines rotational speed of the planetary carrier 22c and in turn rotational speed of the output side ring gear 22r as governed by the aforesaid Gear Ratios 1 and 2.

Accordingly, when the rotational speed of the planetary carrier 22c is maintained and the sun gear 22s is rotated in the same direction, rotational speed of the planetary gears 22p decreases, so that rotational speed of the output-side ring gear 22r is reduced (the planetary carrier 22c and sun gear 22s both rotate counterclockwise (CCW), thereby reducing rotational speed of the clockwise (CW) rotating ring gear 22r).

Conversely, when the rotational speed of the planetary carrier 22c is maintained and the sun gear 22s is rotated in the opposite direction, rotational speed of the planetary gears 22p increases, so that rotational speed of the output-side ring gear 22r also increases.

Thus if the M/G 16 is, in the role of the generator 16b, rotated centered on and in the same direction as mechanical power from the GT 20, generated power can be obtained while simultaneously reducing rotor rotational speed. Conversely, if the M/G 16 is supplied power to rotate in reverse as the motor 16a, rotor rotational speed can be increased.

Thus in the multicopter 10 according to this embodiment a configuration is adopted whereby the planetary carriers 22c of the speed reducer mechanisms 22 installed individually in the four rotors 14 are supplied with identical rotational speeds from the single GT 20 in order to control ascension and descension of the of the multicopter 10 as described later.

In the multicopter 10 according to this embodiment, power ratings are defined as about 100 kW for the GT 20, about 20 kW for the M/Gs 16 and about 10 kW for the battery 26.

As considerable mechanical energy is therefore available from the GT 20, some of the GT 20 power can be extracted through the sun gear 22s for constantly charging the battery 26, so that as no need to handle high power arises a battery 26 of smaller capacity can be adopted.

Moreover, posture control of the multicopter 10 is performed by rotating each set of diagonally opposed rotors 14 in opposite direction from the other set and increasing/decreasing rotation thereof so as to regulate posture, but since the M/Gs 16 can operate as either motors 16a or generators 16b, a M/G 16 on the decreased rotation side can be made to function as the generator 16b and to supply the power it generates to a M/G 16 on the increased rotation side so as to assist rotational speed increase of the associated rotor 14, which operating mode also helps to reduce required capacity of the battery 26.

As shown in FIG. 5, the flight controller 32 is configured as an ECU (Electronic Control Unit) comprising at least one MPU (microprocessor unit) 32a, a CPU, and multiple memories 32b including ROM, RAM and the like.

In addition, the frame 12 is provided at suitable locations with a gyrosensor 34 that produces an output indicating tilt angle of the frame 12 with respect to gravity axis of the frame 12, an altimeter 36 that produces an output indicating altitude (height) above ground level calculated based on a reflected wave obtained when an ultrasonic wave is transmitted from the frame 12 toward the ground, a GPS receiver 40 that produces an output indicating position of the frame 12 calculated based on signals received from a group of satellites, and vision sensors 42 that output captured images taken in advancing direction.

As shown in FIG. 6, the speed reducer mechanisms 22 are equipped with rotational speed sensors 44 that are installed near the input-output shafts 16c of the motors 16a of the M/Gs 16 and produce outputs indicating rotational speeds of the motors 16a. The sensor outputs of the aforesaid gyrosensor 34 and other sensors are sent to the flight controller 32

A main switch 46 is provided on the frame 12 at a suitable location, and when the main switch 46 is turned ON by an operator (user), the GT 20 starts and the flight controller 32 commences operation upon operating power being supplied to its MPU 32a from the generators 16b of the M/Gs 16.

In addition, an input unit 50 and a display 52 are connected to the flight controller 32 and the operator starts operation of the multicopter 10 by using the input unit 50 to specify a destination, flight course and other instructions.

As pointed out earlier, the frame 12 of the multicopter 10 is not directionally differentiated (has no front, rear, left or right directions) and the multicopter 10 itself is configured to have arbitrary 360-degree flight capability The vision sensors 42 are therefore multiply provided on the frame 12 at suitable angles. Another option is to install only a single vision sensor 42 capable of 360-degree rotation.

In the flight controller 32, the MPU 32a executes a program loaded in memory 32b so as to control takeoff/landing and posture of the frame 12 based on outputs of the gyrosensor 34, altimeter 36, GPS receiver 40, vision sensors 42 and rotational speed sensors 44, namely, a configuration is adopted whereby a control unit 32a1 is implemented for controlling takeoff and landing of the multicopter 10 and posture of the frame 12 or whereby the MPU 32a is programed to control takeoff and landing of the multicopter 10 and posture of the frame 12.

There next follows an explanation of takeoff and other operations of the multicopter 10 performed by the flight controller 32 in accordance with the first embodiment.

Figure 7:
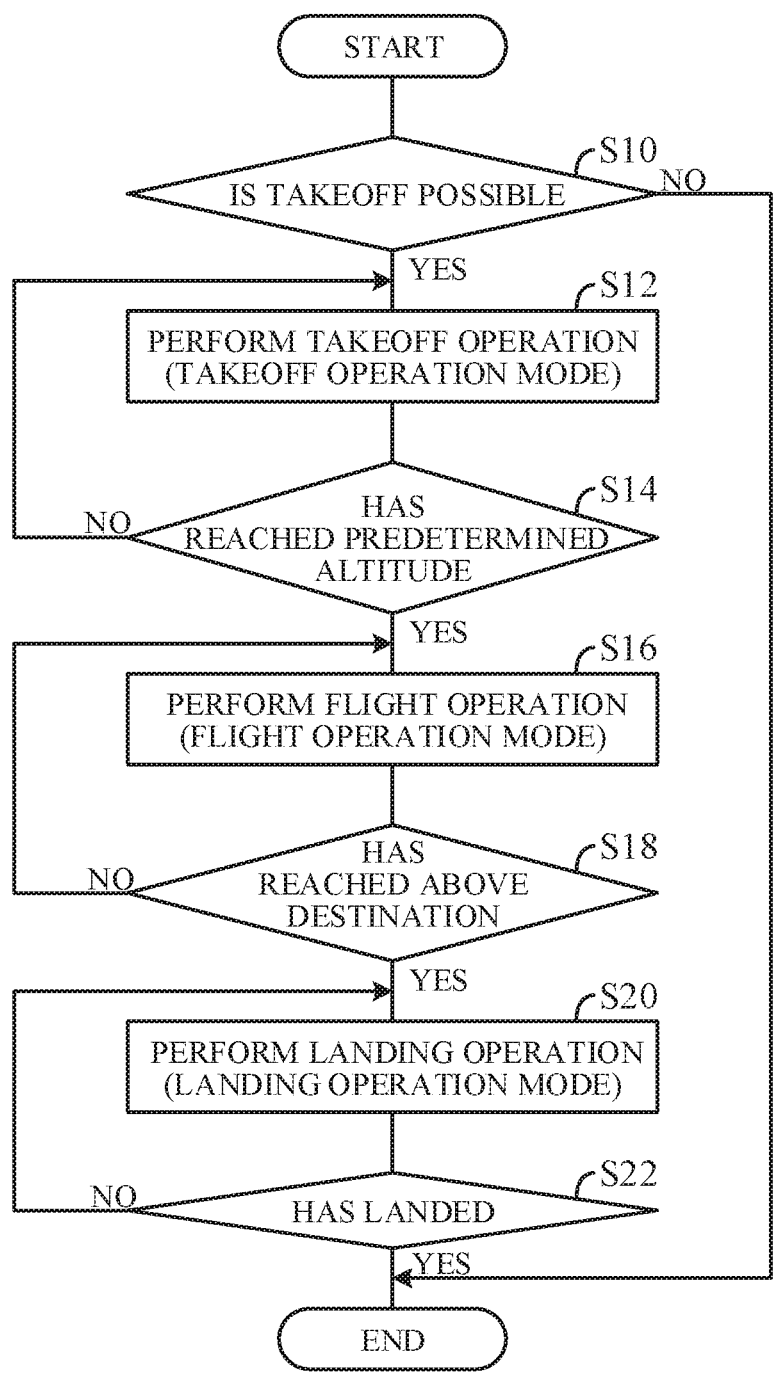
FIG. 7 is a flowchart showing operations of the flight controller.
Figure 9:
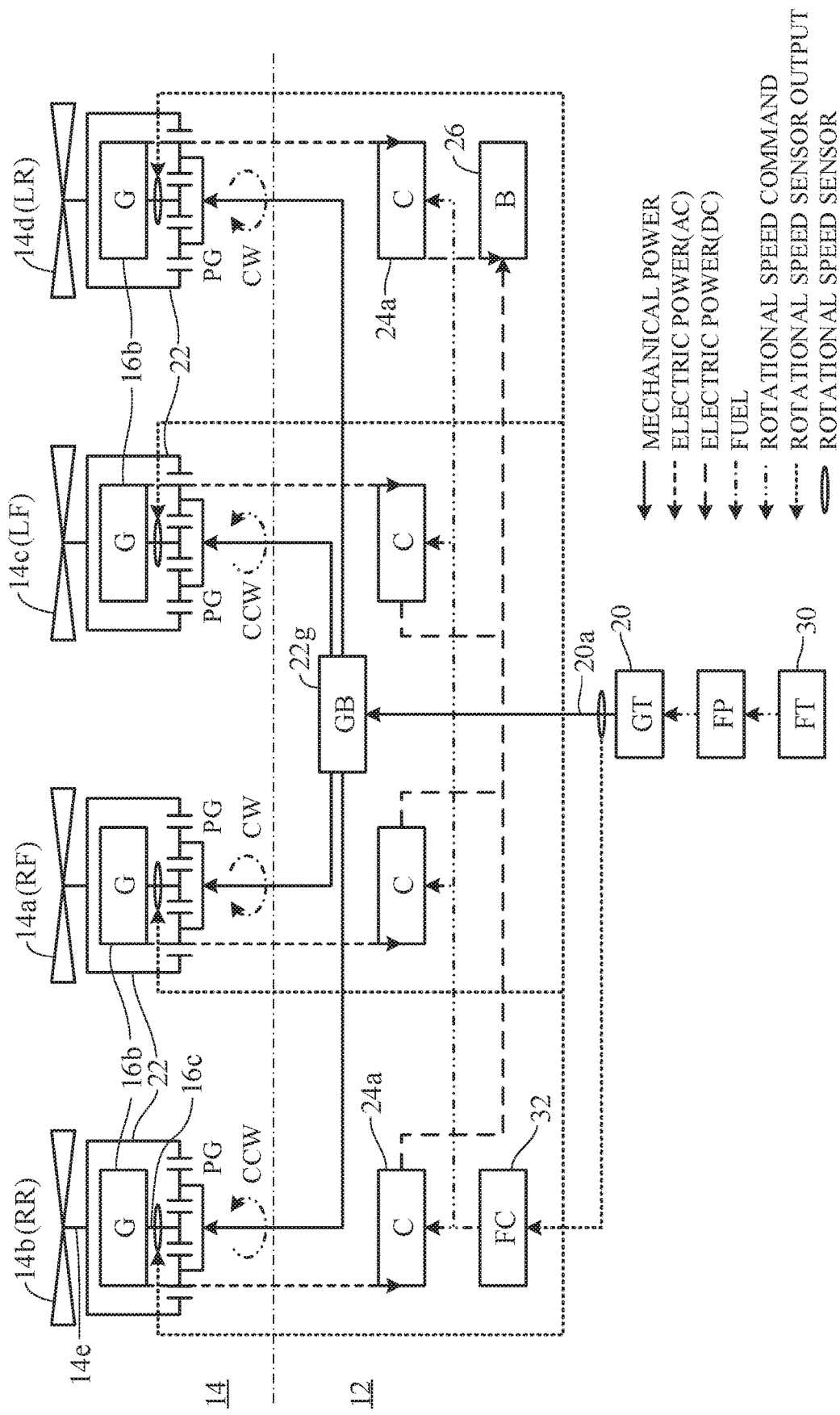
FIG. 9 is an explanatory diagram showing GT and M/G energy transmission during landing.
Figure 10:
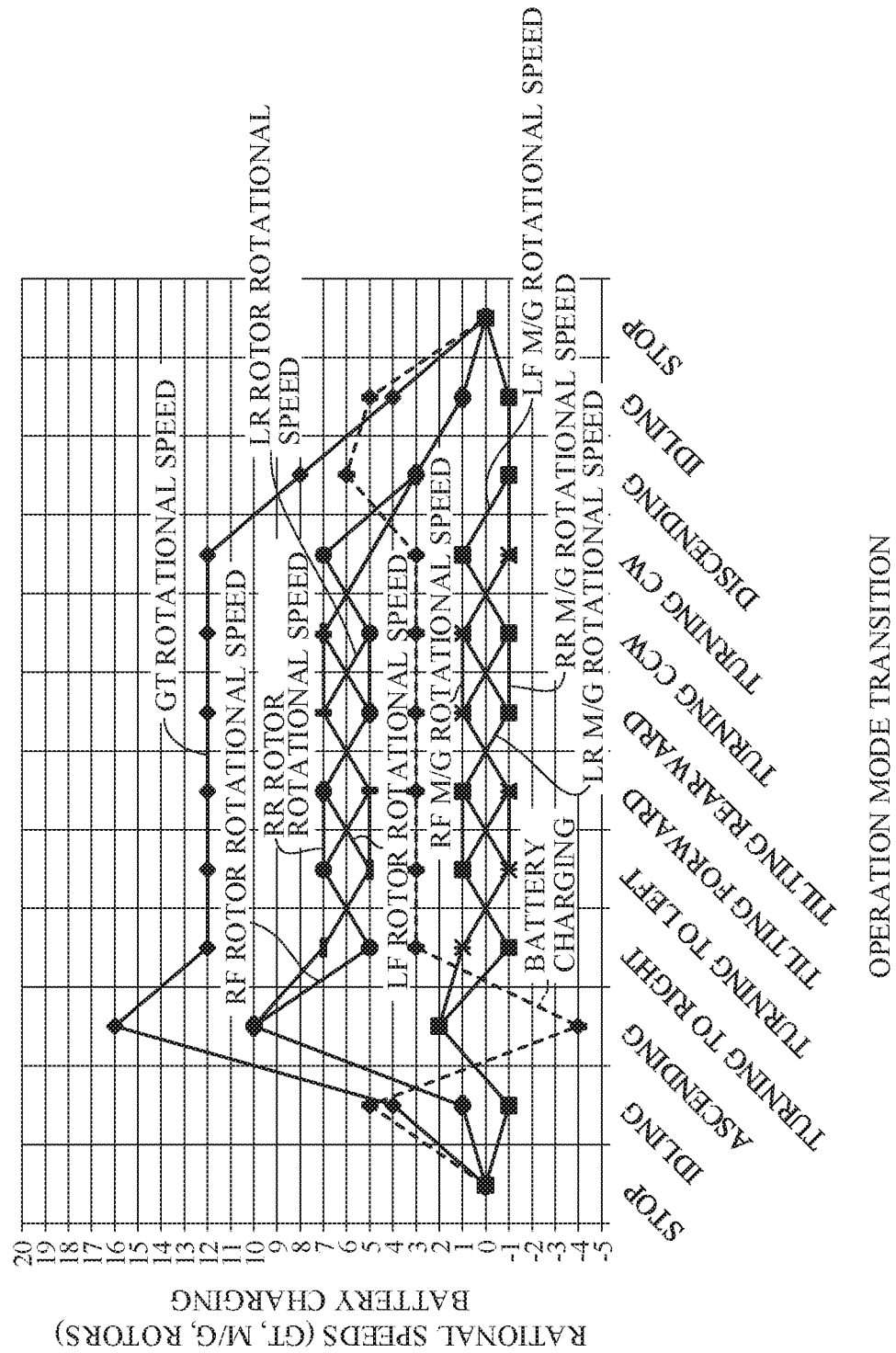
FIG. 10 is an explanatory diagram showing the aforesaid landing and other operating mode transitions.

FIG. 7 is a flowchart showing operations of the flight controller, FIGS. 8 and 9 are explanatory diagrams showing GT 20 and M/G 16 energy transmission during flight and landing, and FIG. 10 is an explanatory diagram showing the aforesaid landing and other operating mode transitions.

Turning to an explanation with reference to FIG. 7, it is determined whether takeoff is possible in S10 (S: processing Step), and when the result is NO the ensuing processing is skipped, and when YES, the program goes to S12, in which takeoff operation is performed.

In takeoff operation, as shown in FIG. 6, the GT 20 is rotated using fuel supplied from the FT (fuel tank) 30 through a fuel pump (FP), and the resulting rotation is applied to control rotation of the rotors 14 so as to evenly increase rotational speed of the four rotors 14.

In addition, power stored in the battery (B) 26 is applied to the M/Gs 16 to rotate the motors 16a and assist rotation of the rotors 14. Size of the GT 20 can therefore be reduced compared to that in a configuration that cannot utilize power of the battery 26.

In the flowchart of FIG. 7, the program next goes to S14, in which it is determined whether the multicopter 10 has reached a predetermined altitude based on the output of the altimeter 36, i.e., whether the takeoff operation has been completed, and when the result is NO, the program returns to S12, and when YES, the program goes to S16, in which flight (horizontal flight) operation is performed.

In flight operation, the multicopter 10 flies to the input destination as its posture is being finely adjusted based on the output of the gyrosensor 34. For example, flight direction is controlled by reducing rotational speed of two forward direction associated rotors among the four rotors 14 and increasing rotational speed two rearward direction associated rotors thereamong.

When turning, for example, turning to the right, is to be performed, rotational speed of two right side associated rotors (RF and RR) among the four rotors 14 is reduced and rotational speed of two left side associated rotors (LF and LR) is increased, whereby the multicopter 10 is turned in the desired direction by reaction force of the rotors 14 on the side of higher rotational speed. Degree of turning is adjusted by increasing/decreasing rotational speed of the rotors 14.

In rotation control (control of rotation around yaw axis), CCW rotation of the frame 12 is performed by increasing rotational speed of the CW rotation side rotors 14a and 14d among the rotors 14 and lowering rotational speed CCW side rotors 14b and 14c thereamong. CW rotation of the frame 12 is performed in reverse from the aforesaid.

As indicated in FIG. 8, which illustrates operation when turning right, reduction of rotor 14 rotational speed is performed by partially utilizing rotation of the GT 20 to drive the generators 16b (regeneration) and converting the generated power obtained to DC power by the converter 24a of the PDU 24. Concurrently, the obtained DC power is inverted to AC power by the inverter 24b of the PDU 24 and used to drive the motors 16a, thereby assisting rotation of the GT 20.

As power obtained from the generators 16b at this time is instantly consumed by the motors 16a, the generation and consumption of power becomes direct without going through the battery 26. As required charging and discharging of the battery 26 is therefore minimized, a battery 26 of small size suffices.

In the flowchart of FIG. 7, the program next goes to S18, in which it is determined whether the multicopter 10 has reached a point above the destination from the output from the GPS receiver 40, and when the result is NO, the program returns to S16, and when YES, goes to S20, in which landing operation is performed, i.e., operating mode is shifts to landing operation. The landing operation is continued until the landing is confirmed at S22.

Landing operation of the multicopter 10 is performed by lowering the rotational speed of all four rotors 14. Reduction of rotational speed is performed by partially utilizing rotation of the GT 20 to drive the generators 16b (regeneration), and as shown in FIG. 9, power generated by the generators 16b is converted to DC power by the converter 24a of the PDU 24 and stored in the battery 26.

FIG. 10 is an explanatory diagram showing transition of the aforesaid landing and other operating modes of the multicopter 10.

In FIG. 10, that rotation of a M/G 16 is positive means it is operating (functioning) as the motor 16a, while that rotation thereof is negative means it is operating as the generator 16b. As regards the battery 26, a positive value means charging and a negative value means discharging.

The configuration of the first embodiment described in the foregoing is such that mechanical power from the GT 20 is inputted to the speed reducer mechanisms 22 so as to rotate the rotors 14 while operating the M/Gs 16 as generators 16b or motors 16a, whereby ratio of weight to output can be reduced and cruising range increased, thereby achieving enhanced fuel efficiency performance.

Second Embodiment

Figure 11:
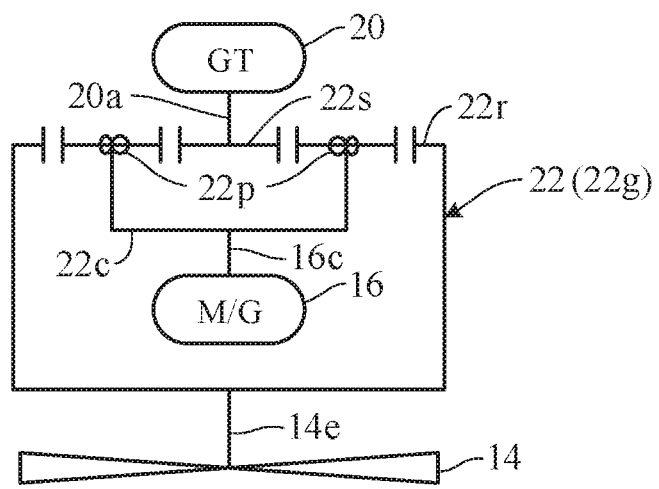
FIG. 11 is an explanatory diagram similar to that of FIG. 4, schematically representing a speed reducer mechanism of the multicopter in accordance with a second embodiment of this invention.

FIG. 11 is an explanatory diagram similar to that of FIG. 4, schematically representing a speed reducer mechanism 22 of the multicopter 10 in accordance with a second embodiment of this invention.

Turning to an explanation focused on points of difference from the first embodiment, a configuration is adopted in the speed reducer mechanisms 22 of the second embodiment whereby the output shaft 20a of the GT 20 is connected to the sun gear 22s of the planetary gear mechanism, the input-output shaft 16c of the M/G 16 is connected to the planetary carrier 22c of the planetary gear mechanism, and the ring gear 22r of the planetary gear mechanism is connected to the input shaft 14e of the rotor 14.

As in the first embodiment, the configuration is such that mechanical power from the GT 20 is inputted to the speed reducer mechanisms 22 so as to rotate the rotors 14 while operating the M/Gs 16 as generators 16b or motors 16a, whereby ratio of weight to output can be reduced and cruising range increased, thereby achieving enhanced fuel efficiency performance. Other features an effects are no different from those of the first embodiment.

Third Embodiment

Figure 12:
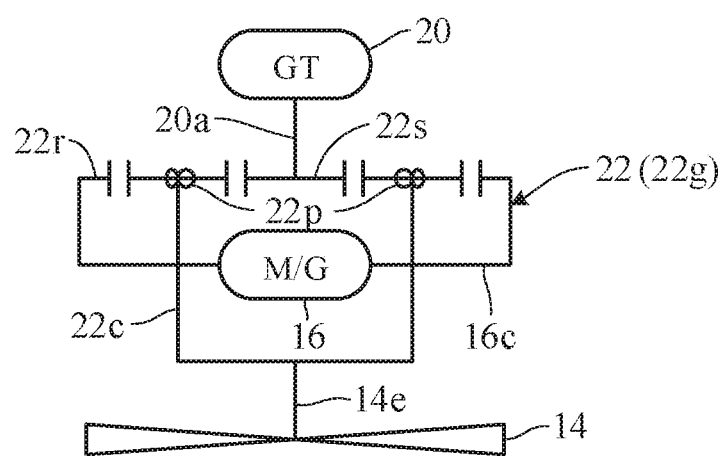
FIG. 12 is an explanatory diagram similar to that of FIG. 4, schematically representing a speed reducer mechanism of the multicopter in accordance with a third embodiment of this invention.

FIG. 12 is an explanatory diagram similar to that of FIG. 4, schematically representing a speed reducer mechanism of the multicopter 10 in accordance with a third embodiment of this invention.

Turning to an explanation focused on points of difference from the foregoing embodiments, a configuration is adopted in the speed reducer mechanisms 22 of the third embodiment whereby the output shaft 20a of the GT 20 is connected to the sun gear 22s of the planetary gear mechanism, the input-output shaft 16c of the M/G 16 is connected to the ring gear 22r of the planetary gear mechanism, and the planetary carrier 22c of the planetary gear mechanism is connected to the input shaft 14e of the rotor 14.

Also in the third embodiment, similarly to in the first embodiment, a configuration is adopted such that mechanical power from the GT 20 is inputted to the speed reducer mechanisms 22 so as to rotate the rotors 14 while operating the M/Gs 16 as generators 16b or motors 16a, whereby ratio of weight to output can be reduced and cruising range increased, thereby achieving enhanced fuel efficiency performance. Other features and effects are no different from those of the first embodiment.

Fourth Embodiment

Figure 13:
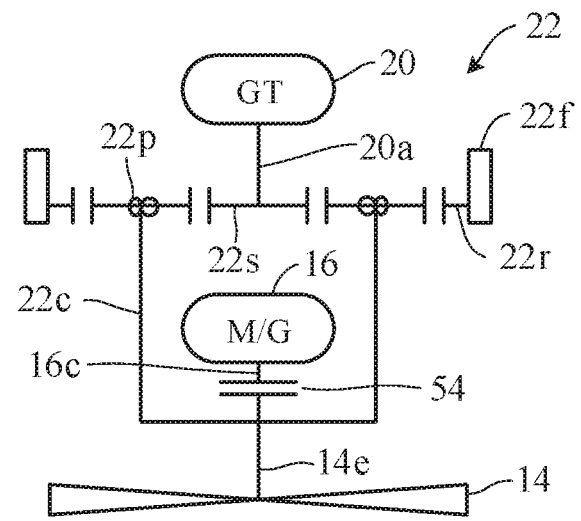
FIG. 13 is an explanatory diagram similar to that of FIG. 4, schematically representing a speed reducer mechanism of the multicopter in accordance with a fourth embodiment of this invention.

FIG. 13 is an explanatory diagram similar to that of FIG. 4, schematically representing a speed reducer mechanism of the multicopter 10 in accordance with a fourth embodiment of this invention.

Turning to an explanation focused on points of difference from the foregoing embodiments, a configuration is adopted in the speed reducer mechanisms 22 of the fourth embodiment whereby the output shaft 20a of the GT 20 is connected to the sun gear 22s of the planetary gear mechanism, the ring gear 22r of the planetary gear mechanism is fastened to a fixed part 22f of the speed reducer mechanisms 22, and the planetary carrier 22c of the planetary gear mechanism is connected through a clutch 54 to the input-output shaft 16c of the M/G 16 and the input shaft 14e of the rotor 14.

In other words, clutches 54 are interposed between the input-output shafts 16c of the M/Gs 16 and the input shafts 14e of the rotors 14 in a configuration such that rotation of the output shaft 20a of the GT 20 is inputted to the M/Gs 16 through the associated sun gears 22s when the associated clutches 54 are turned ON. ON/OFF operation of the clutches 54 is controlled by the flight controller 32.

Also in the fourth embodiment, a configuration is adopted such that mechanical power from the GT 20 is inputted to the speed reducer mechanisms 22 so as to rotate the rotors 14 while operating the M/Gs 16 as generators 16b or motors 16a, whereby ratio of weight to output can be reduced and cruising range increased, thereby achieving enhanced fuel efficiency performance. Other features and effects are no different from those of the first embodiment.

Fifth Embodiment

Figure 14:
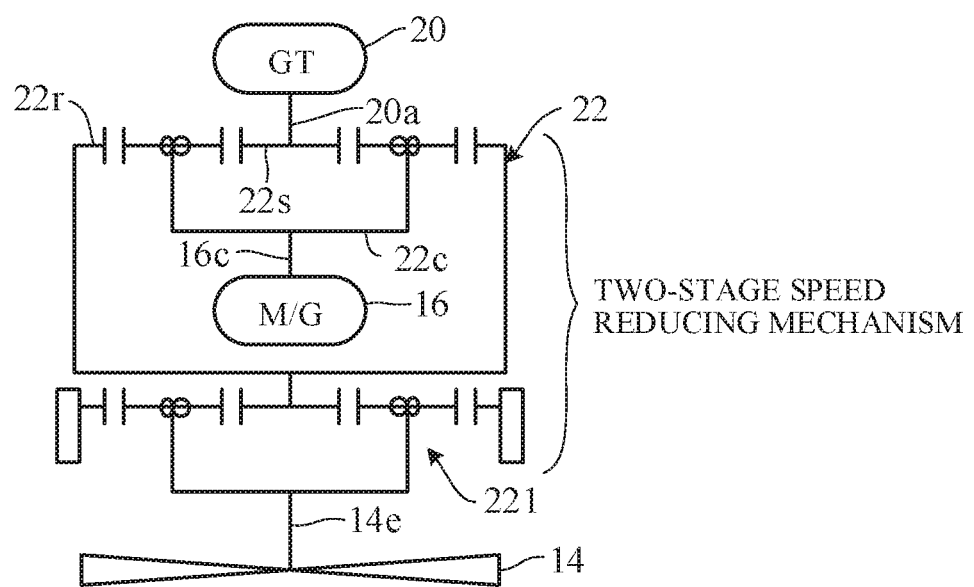
FIG. 14 is an explanatory diagram similar to that of FIG. 4, schematically representing a speed reducer mechanism of the multicopter in accordance with a fifth embodiment of this invention.

FIG. 14 is an explanatory diagram similar to that of FIG. 4, schematically representing a speed reducer mechanism of the multicopter 10 in accordance with a fifth embodiment of this invention.

Turning to an explanation focused on points of difference from the foregoing embodiments, a configuration is adopted in the speed reducer mechanisms 22 of the fifth embodiment whereby the output shaft 20a of the GT 20 is connected to the sun gear 22s of the planetary gear mechanism, the input-output shaft 16c of the M/G 16 is connected to the planetary carrier 22c of the planetary gear mechanism, and the ring gear 22r of the planetary gear mechanism is connected through a second speed reducer mechanisms (planetary gear mechanism) 221 to the input shaft 14e of the rotor 14.

Also in the fifth embodiment, a configuration is adopted such that mechanical power from the GT 20 is inputted to the speed reducer mechanisms 22 so as to rotate the rotors 14 while operating the M/Gs 16 as generators 16b or motors 16a, whereby, although structure becomes somewhat more complicated than those of the earlier embodiments, large speed reduction is enabled, ratio of weight to output can be reduced and cruising range increased, thereby achieving enhanced fuel efficiency performance. Other features and effects are no different from those of the first embodiment.

As stated above, the first to fifth embodiments are configured to have a multicopter (10), comprising: a frame (12); multiple rotors (14) attached to the frame and each having an input shaft (14e); multiple motor-generators (16) installed one on each of the multiple rotors (14) and each having an input-output shaft (16c); an engine (gas-turbine engine (GT) 20) connected to the multiple motor-generators (16) and having an output shaft (20a); and multiple speed reducer mechanisms (22) each comprising a planetary gear mechanism installed on one of the multiple rotors (14); the planetary gear mechanism having a sun gear (22s), ring gear (22r) and planetary carrier (22c) which connects planetary gears 22p; wherein the input shaft (14e) of each rotor (14), the input-output shaft (16c) of each motor-generator (16) and the output shaft (20a) of the engine (20) are connected with each other by each speed reducer mechanism (22), whereby ratio of weight to output can be reduced and cruising range increased, thereby achieving enhanced fuel efficiency performance. In the multicopter (10), a number of the rotor 14 is 2n (n≥2).

In the multicopter, the output shaft (20a) of the engine (20) is connected to the planetary carrier (22c) of the planetary gear mechanism the input-output shaft (16c) of the motor-generator (16) is connected to the sun gear (22s) of the planetary gear mechanism, and the ring gear (22r) of the planetary gear mechanism is connected to the input shaft (14e) of the rotor (14), whereby ratio of weight to output can be further reduced and cruising range further increased, thereby achieving enhanced fuel efficiency performance.

In the multicopter (10), the output shaft (20a) of the engine (20) is connected to the sun gear (22s) of the planetary gear mechanism, the input-output shaft (16c) of the motor-generator (16) is connected to the planetary carrier (22c) of the planetary gear mechanism, and the ring gear (22r) of the planetary gear mechanism is connected to the input shaft (14e) of the rotor (14), whereby ratio of weight to output can be further reduced and cruising range further increased, thereby achieving enhanced fuel efficiency performance.

In the multicopter (10), the output shaft (20a) of the engine (20) is connected to the sun gear (22s) of the planetary gear mechanism, the input-output shaft (16c) of the motor-generator (16) is connected to the ring gear (22r) of the planetary gear mechanism, and the planetary carrier (22c) of the planetary gear mechanism is connected to the input shaft (14e) of the rotor (14), whereby ratio of weight to output can be further reduced and cruising range further increased, thereby achieving enhanced fuel efficiency performance.

In the multicopter (10), the output shaft (20a) of the engine (20) is connected to the sun gear (22s) of the planetary gear mechanism, the ring gear (22r) of the planetary gear mechanism is fastened to a fixed part (22f) of the speed reducer mechanism, and the planetary carrier (22c) of the planetary gear mechanism is connected through a clutch (54) to the input-output shaft (16c) of the motor-generator (16) and the input shaft (14e) of the rotor (14), whereby ratio of weight to output can be further reduced and cruising range further increased, thereby achieving enhanced fuel efficiency performance.

In the multicopter (10), the output shaft (20b) of the engine (20) is connected to the sun gear (22s) of the planetary gear mechanism, the input-output shaft (16c) of the motor-generator (16) is connected to the planetary carrier (22c) of the planetary gear mechanism, and the ring gear (22r) of the planetary gear mechanism is connected through a second speed reducer mechanisms (221) to the input shaft (14e) of the rotor (14), whereby, although structure becomes somewhat more complicated than those of the earlier embodiments, large speed reduction is enabled, ratio of weight to output can be reduced and cruising range increased, thereby achieving enhanced fuel efficiency performance.

The multicopter (10) further includes: a gyrosensor (34) configured to produce an output indicating tilt angle of the frame (12) with respect to gravity axis of the frame; an altimeter (36) configured to produce an output indicating altitude above ground level calculated based on a reflected wave obtained when an ultrasonic wave is transmitted from the frame (12) toward the ground; a GPS receiver (40) configured to produce an output indicating position of the frame (12) calculated based on signals received from a group of satellites; a vision sensor (42) configured to output captured images taken in advancing direction; and a flight controller (32) configured to control takeoff/landing and posture of the frame (12) based on outputs of the gyrosensor, altimeter, GPS receiver and vision sensor. With this, in addition to the advantages and effects, it becomes possible to control flight including takeoff and landing with proper posture.

In the multicopter (10), the motor-generator (16) is connected to a battery (26) through a power drive unit (24) equipped with a converter (24a) and an inverter (24b) in such manner that the converter converts AC power generated by the motor-generator to be stored in the battery and the inverter inverts the DC power stored in the battery to the AC power.

In the multicopter (10), the flight controller (32) operates the engine (20) to rotate all of the rotors (14) and apply power stored in the battery (26) to the motor-generators (16) to rotate motors to assist operation of the engine, when taking off. With this, compared to a case where no battery power can be utilized, it becomes possible to make size of the engine 20 smaller.

In the multicopter (10), the flight controller (32) unitizes rotation of one of the rotors (14) whose rotation is to be reduced to regeneration of one of the motor-generator (16) associated with one of the rotors and electric power obtained by the regeneration is supplied to another of the motor-generators associated with another of the rotors whose rotation is to be increased, when turning. With this, it becomes possible to minimize required charging and discharging minimize and to make size of the battery 26 still more smaller.

In the multicopter (10), the flight controller (3) utilizes all of the rotors (24) to regeneration of all of the motor-generators (16), when landing. With this, it becomes possible to make size of the battery 26 yet still smaller.

Although the engine 20 is explained as a turboshaft engine in the foregoing, the engine 12 can instead be an internal combustion engine of reciprocating type. Specifically, when required output is equal to or greater than 50 kW, the turboshaft engine should be preferable. On the other hand, when the output is less than 50 kW, the internal combustion engine should be preferable.

While the present invention has been described with reference to the preferred embodiments thereof, it will be understood, by those skilled in the art, that various changes and modifications may be made thereto without departing from the scope of the appended claims.

What is claimed is:

1. A multicopter, comprising:
   a frame;
   multiple rotors attached to the frame and each having an input shaft;
   multiple motor-generators installed one on each of the multiple rotors and each having an input-output shaft;
   an engine connected to the multiple motor-generators and having an output shaft; and
   multiple speed reducer mechanisms each comprising a planetary gear mechanism installed on one of the multiple rotors; the planetary gear mechanism having a sun gear, ring gear and planetary carrier which connects planetary gears;
   wherein the input shaft of each rotor, the input-output shaft of each motor-generator and the output shaft of the engine are connected with each other by each speed reducer mechanism.

2. The muliticopter according to claim 1, wherein the output shaft of the engine is connected to the planetary carrier of the planetary gear mechanism, the input-output shaft of the motor-generator is connected to the sun gear of the planetary gear mechanism, and the ring gear of the planetary gear mechanism is connected to the input shaft of the rotor.

3. The multicopter according to claim 1, wherein the output shaft of the engine is connected to the sun gear of the planetary gear mechanism, the input-output shaft of the motor-generator is connected to the planetary carrier of the planetary gear mechanism, and the ring gear of the planetary gear mechanism is connected to the input shaft of the rotor.

4. The multicopter according to claim 1, wherein the output shaft of the engine is connected to the sun gear of the planetary gear mechanism, the input-output shaft of the motor-generator is connected to the ring gear of the planetary gear mechanism, and the planetary carrier of the planetary gear mechanism is connected to the input shaft of the rotor.

5. The multicopter according to claim 1, wherein the output shaft of the engine is connected to the sun gear of the planetary gear mechanism, the ring gear of the planetary gear mechanism is fastened to a fixed part of the speed reducer mechanism, and the planetary carrier of the planetary gear mechanism is connected through a clutch to the input-output shaft of the motor-generator and the input shaft of the rotor.

6. The multicopter according to claim 1, wherein the output shaft of the engine is connected to the sun gear of the planetary gear mechanism, the input-output shaft of the motor-generator is connected to the planetary carrier of the planetary gear mechanism, and the ring gear of the planetary gear mechanism is connected through a second speed reducer mechanisms to the input shaft of the rotor.

7. The multicopter according to claim 1, further including:
   a gyrosensor configured to produce an output indicating tilt angle of the frame with respect to gravity axis of the frame;
   an altimeter configured to produce an output indicating altitude above ground level calculated based on a reflected wave obtained when an ultrasonic wave is transmitted from the frame toward the ground;
   a GPS receiver configured to produce an output indicating position of the frame calculated based on signals received from a group of satellites;
   a vision sensor configured to output captured images taken in advancing direction; and
   a flight controller configured to control takeoff/landing and posture of the frame based on outputs of the gyrosensor, altimeter, GPS receiver and vision sensor.

8. The multicopter according to claim 7, wherein the motor-generator is connected to a battery through a power drive unit equipped with a converter and an inverter in such manner that the converter converts AC power generated by the motor-generator to be stored in the battery and the inverter inverts the DC power stored in the battery to the AC power.

9. The multicopter according to claim 1, wherein a number of the rotor is 2n (n≥2).

10. The multicopter according to claim 8, wherein the flight controller operates the engine to rotate all of the rotors and apply power stored in the battery to the motor-generators to rotate motors to assist operation of the engine, when taking off.

11. The multicopter according to claim 8, wherein the flight controller unitizes rotation of one of the rotors whose rotation is to be reduced to regeneration of one of the motor-generator associated with one of the rotors and electric power obtained by the regeneration is supplied to another of the motor-generators associated with another of the rotors whose rotation is to be increased, when turning.

12. The multicopter according to claim 8, wherein the flight controller utilizes all of the rotors to regeneration of all of the motor-generators, when landing.

* * * * *